(12) United States Patent
Hao et al.

(10) Patent No.: US 6,728,214 B1
(45) Date of Patent: Apr. 27, 2004

(54) TESTING OF NETWORK ROUTERS UNDER GIVEN ROUTING PROTOCOLS

(75) Inventors: Ruibing Hao, Scotch Plains, NJ (US); David Lee, Warren, NJ (US); Rakesh Kumar Sinha, Manville, NJ (US); Dario Vlah, Cambridge, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 736 days.

(21) Appl. No.: 09/614,434

(22) Filed: Jul. 12, 2000

Related U.S. Application Data (60) Provisional application No. 60/146,080, filed on Jul. 28, 1999.

(51) Int. Cl.⁷ .............................................. G01R 31/08
(52) U.S. Cl. ..................... 370/241; 370/250; 370/254; 709/224
(58) Field of Search ............................ 370/241, 241.1, 370/242, 252, 254, 255, 389, 395.21, 295.31; 709/223, 224, 220, 221

(56) References Cited

U.S. PATENT DOCUMENTS

| | | | | |
|---|---|---|---|---|
| 5,867,689 A | * | 2/1999 | McLain, Jr. .................. | 703/23 |
| 6,243,357 B1 | * | 6/2001 | Sasagawa .................... | 370/216 |
| 6,408,335 B1 | * | 6/2002 | Schwaller et al. ........... | 709/224 |
| 6,442,141 B1 | * | 8/2002 | Borella et al. ............... | 370/248 |
| 6,442,615 B1 | * | 8/2002 | Nordenstam et al. ....... | 709/241 |
| 6,483,811 B1 | * | 11/2002 | Jabbarnezhad .............. | 370/250 |
| 6,584,073 B1 | * | 6/2003 | Steele et al. ................. | 370/254 |

FOREIGN PATENT DOCUMENTS

| | | | | |
|---|---|---|---|---|
| JP | 411163916 A | * | 6/1999 | .......... H04L/12/46 |

OTHER PUBLICATIONS

Rexford et al, "PP–MESS–SIM: A Simulator for Evaluationg Multicomputer Interconnection Neworks", Apr. 1995, pp 84–93.*

D. Massey et al, Fault Detection in Routing Protocols, Proc. of Tnt'l Conf. on Network Protocols, 31–40 (1999).

D. Lee, et al, Principles and Methods of Testing Finite State Machines—a Survey, Proc. IEEE, Aug. 1996 at 1089–1123.

J. T. Moy, OSPF Anatomy of an Internet Routing Protocol Addison–Wesley (1998) at 3–25.

* cited by examiner

*Primary Examiner*—Ricky Ngo
*Assistant Examiner*—Alan V. Nguyen (57) ABSTRACT

A network router is tested for operation according to a given network protocol, by coupling the router under test (RUT) to a test host device and arranging the device to simulate operative test network topologies which include router nodes, network nodes, and edges between the nodes. The device exchanges information packets with the RUT for each of a number of successive test network topologies. Each successive topology is determined randomly by inserting or deleting an edge or a node to or from a prior test network topology in a probabilistic manner. Operation of the RUT under the given protocol is evaluated based on the exchanged information packets. A judgment, e.g., a fault or a no-fault condition, is rendered by the host device.

12 Claims, 8 Drawing Sheets

*input.* $n$, $0 \leq p_1, p_2, p_3, p_4 \leq 1$.

*output.* implementation fault or conformance.

1   repeat
2      construct initial network topology graph $G = G_b$ with $V = \{v_0\}$, $V_0 = W = E = E_b = \emptyset$;
3      while ($G_b$ is not complete)
4           UPDATE($v_0$);
5           if ROUTE($v_0$) = FALSE or FPACKET($v_0$) = FALSE;
6               return "faulty";
7   return "conforms"

```
Subroutine UPDATE($v_0$)
parameters: $n$, $m = c(n)$, $0 \leq p_1, p_2, p_3, p_4 \leq 1$.
variables: $G_b = <V,W,E_b>, V_0$.
1  switch ($p$)
2      case '$p_1$': if ($|E_b| < |V| \cdot |W|$)  /* graph is not complete */
3          insert an edge u.a.r. in $E_b$;
4      case '$p_2$': if ($|V_b| + |W| < n+m$)  /* nodes below upper bounds */
5          insert a node u.a.r. in $V \cup W$;
6      case '$p_3$': if ($|E_b| > 0$)  /* edge set not empty */
7          delete an edge u.a.r. from $E_b$;
8      case '$p_4$': if ($|V| + |W| > 1$)  /* node set not empty */
9          delete a node u.a.r. from $V \cup W$;
10 compute $V_0$;  /* neighboring router-nodes of $v_0$ */
11 compute RoutingUpdate;  /* obtain protocol specific routing update information*/
12 return RoutingUpdate
```

FIG. 6

```
Subroutine FPACKET(v_0)
input. variables G_b = <V, W, E_b>, V_0.
1  for each router-node v_i in V_0, i = 1,...,r
2      construct SPT T_i rooted at v_i;
3      for each router-node v in subtree of T_i rooted at v_0
4          send packet P from v_i to v_0 with destination v;
5          let router-node u in V_0 be ancestor of v in T_i;
6          if node u does not receive packet P from v_0
7              return FALSE;
8  return TRUE
```

FIG. 7

```
Subroutine ROUTE(v_0)
variables. V_0. /* neighboring router-nodes of v_0 */
1  for nodes in V_0 in random permutation: v_i, i = 1, 2,...,r
2      construct distance vector D_i of v_i;
3      send to v_0 distance vector: D_i* := split_horizon(D_i);
4      construct updated (expected) distance vector of v_0: D_0 := D_0 ⊕ D_i*;
5      obtain distance vector of v_0: D̂_0; /* via RIP protocol interface with v_0 */
6      if (D̂_0 ≠ D_0)
7          return FALSE;
8  return TRUE;
```

FIG. 8

```
Subroutine ROUTE(v_0)
input. LSA.
variables. V_0. /* neighboring router-nodes of v_0 */
1  if (changed link not adjacent to v_0)
2      select u.a.r. a node v_r in V_0 reachable from changed links;
3          send LSA from v_r to v_0;
4  else /* changed links adjacent to v_0 */
5          v_0 informed of new link status;
6  for each v_i, i ≠ r, in V_0 /* check LSA flooding from v_0 */
7          receive L$\hat{S}$A from v_0; /* via protocol interface */
8          if L$\hat{S}$A ≠ LSA
9              return FALSE;
10 compute expected LSD for v_0: D_0;
11 obtain LSD from v_0: $\hat{D}_0$; /* via explicit LSD download */
12 if ($\hat{D}_0$ ≠ D_0) /* check LSD of v_0 */
13         return FALSE;
14 calculate the expected routing table R_0 from this LSD;
15 obtain routing table $\hat{R}_0$ from v_0;
16 if ($\hat{R}_0$ ≠ R_0) /* check routing table of v_0 */
17         return FALSE;
18 return TRUE;
```

TESTING OF NETWORK ROUTERS UNDER GIVEN ROUTING PROTOCOLS

This application claims the benefit of Provisional application Ser. No. 60/146,080, filed Jun. 28, 1999.

BACKGROUND OF THE INVENTION

1. Field of the Invention

This invention relates to testing of network routers, particularly for compliance with Internet routing protocols.

2. Discussion of the Known Art

The Internet is a packet-switched network that enables linked host computers to exchange information in the form of packets. When information packets are transmitted from a source node to a destination node via the network, routing decisions are made by special purpose computers called Internet protocol (IP) routers. The routers are connected using a variety of linking media including, e.g., telephone lines, Ethernet segments, satellite links, ATM and FDDI.

To route packets correctly and efficiently, routers must follow a set of rules known as routing protocols. See C. Huitema, Routing in the Internet, Prentice-Hall (1995). Typical protocols used for Internet traffic include Routing Information Protocol (RIP) Open Shortest Path First (OSPF) and Border Gateway Protocol (BGP). See C. Hedrick, RFC 1058, the Internet Engineering Task Force (June 1988); J. T. Moy, OSPF—Anatomy of an Internet Routing Protocol, Addison-Wesley (1998); and Y. Rekhter, et al., RFC 1771, Internet Engineering Task Force (March 1995). While there are no precise specifications for these routing protocols, there are commonly expected invariant behaviors for routers such as (1) compiling a correct routing table, (2) proper packet forwarding, and (3) accumulating correct network topology information. Thus, it is important to test whether or not a given router will operate as expected in a network where it is to be deployed.

Internet usage is increasing rapidly. Sophisticated functions and services, such as service differentiation, quality-of-service (QoS) routing, multi casting, and World Wide Web are introduced on a regular basis. Because the design and implementation of routing protocols in such an environment are complex, proper testing of routers to be used on the Internet under a given protocol, is indispensable.

Typical systems and tools for detecting IP router faults, may be classified either as passive monitoring tools or as active testing tools. An approach used by most monitoring tools such as "RouteMonitor" works as follows. A collection of monitoring devices are deployed in an existing network to observe traffic exchanged between network routers. The devices are passive in that they do not inject route updates into the network. Based on observed routing information, the devices imitate the operation of a real router, execute a given routing protocol, and compute a routing table. Faults are then found by comparing the computed routing tables with an analysis of statistics for each route in the routing table. See D. Massey, et al, Fault Detection in Routing Protocols, Proceeding of International Conference on Network Protocols, pages 31–40 (1999).

Active testing is more effective for fault detection. Available commercial tools include Qosnetics QA Robot and Midnight ANVIL. See Qosnetics, QA robot, (now Agilent Technologies, Inc., Palo Alto, Calif.) (2000); and Midnight Networks, Anvil, (now Empirix, Waltham, Mass.). These tools generate a set of tests for "typical" network configurations or topologies. Because it is not feasible computationally to consider all possible network configurations, existing tools consider only a small subset of possible configurations. Moreover, this subset is chosen in an ad-hoc manner. Thus, even if a router passes all tests using a current tool, there remains a lack of statistical confidence in any judgment rendered by the tool.

SUMMARY OF THE INVENTION

According to the invention, a method of testing a network router for operation according to a given protocol, includes coupling a router under test (RUT) to a test host device, and configuring the device to simulate a network having at most a given number of router nodes and at most a given number of network nodes with edges connecting the router and the network nodes to one another. The host device sends information packets to and receives information packets from the RUT for each of a number of test network topologies under the given protocol. Each test network topology is determined by inserting or deleting an edge or a node to or from a prior test network topology in a probabilistic manner. Operation of the RUT is evaluated with respect to at least one of routing table compilation, packet forwarding, and network topology information accumulated by the RUT. A judgment concerning operation of the RUT under the given protocol is then rendered.

For a better understanding of the invention, reference is made to the following description taken in conjunction with the accompanying drawing and the appended claims.

DETAILED DESCRIPTION OF THE INVENTION

The procedure of the present invention embodies active testing to test for faults in a network router. Basically, for each test run, a probablistic set of computations are generated to define a subset of test network topologies in which the router is tested. Several benefits of the present procedure include:

1. High fault coverage is assured.
2. Rather than use a fixed subset of network configurations, with no chance of uncovering a fault that would occur if the router is used in a network configuration outside the fixed set, the present procedure affords a non-zero probability that the router will be tested in any one of all possible configurations.

3. While there is little (if any) benefit in repeating a test using an existing commercial tool, the present procedure produces a different set of test network topologies with each new test run, thus increasing the chance of uncovering a fault.

4. The present procedure tests router behavior in a dynamic environment wherein routers, and networks that are interconnected by the routers, are constantly going up and down. Again, in contrast to the known testing tools, the choice of which router (or network) goes up (or down) is made probabilistically using the present procedure.

In dynamic networks, it is essential under any IP routing protocol that routers operate with correct routing tables and with correct network topology information, and that they cause packets to be sent over correct links (edges) to a given destination node. Thus, a brute-force approach would test such routing table and packet forwarding operations of a router-under-test (RUT) for all possible topologies of a network in which the router is to be deployed. But constructing all possible topologies of the network for testing purposes is too expensive to be practical, since the number of possible network topologies for a given number of router nodes is formidable. Specifically, for a network with n router-nodes, there are $2^{n \lfloor n/2 \rfloor \lceil n/2 \rceil}$ possible network topologies. Accordingly, there is a need for a procedure that can generate tests on a router for a relatively small portion of all possible network topologies, while nevertheless assuring a reasonably high probability of fault detection.

With the present test procedure, a testing environment is created such that the router under test "perceives" it is interacting in a real network with other routers. A workstation or a PC capable of connecting to the RUT is the sole hardware requirement.

Mathematical Models of IP Network Topologies

Consider the following two different graph models of IP network topologies:

I. If routers are connected by point-to-point links (e.g., T1 lines), the topology can be represented as a weighted graph, where nodes of the graph depict routers, and edges represent links between the routers. The weight of an edge represents the cost of taking the corresponding link. This model is used for testing under the Border Gateway Protocol.

Figure 1:
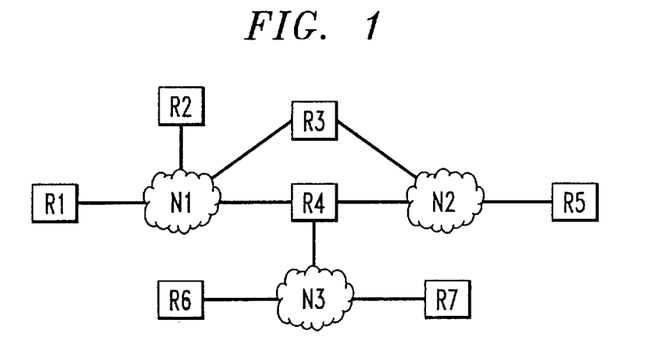
FIG. 1 is a graph of a multi-access network.

II. For multi-access networks such as shown in FIG. 1, where each router R1 to R7 can interface with more than one network N1 to N3 and vice-versa (e.g., routers connected by Ethernet), the topology is modeled as a weighted bipartite graph on router and network nodes. See FIG. 2. This model is used for OSPF protocol testing. Since this model is more general than the first (if each network node is restricted to have degree exactly two, this model becomes similar to the first model), it is now described in more detail.

A network of Internet connections may be modeled by a directed graph G=<V, W, E> where V is a set of router-nodes, W is a set of network-nodes, and E is a set of directed edges. See D. E. Comer, et al, Internetworking with TCP/IP, Vol. II (Prentice-Hall 1999), all relevant portions of which are incorporated by reference. Router-nodes represent routers, and network-nodes represent networks that connect the routers. The interface between the routers and the networks is represented by edges in E, where each edge has one end node in V and the other in W. Specifically, an edge (v,w) from a router-node v in V to a network-node w in W represents a router v interfacing with a network w with a cost c(v,w)>0, and an edge (w,v) from a network-node w in W to a router-node v in V represents a network w interfacing with a router v with a cost c(w,v)=0.

Figure 2:
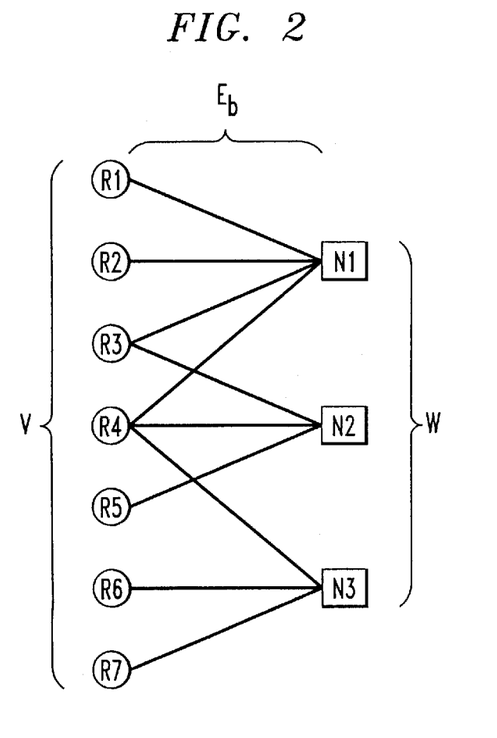
FIG. 2 is a corresponding bi-partite graph of the network in FIG. 1.

A pair of edges (v,w) and (w,v) correspond to a link between router v and network w. Each such pair can be replaced by an undirected edge [v, w] to obtain an undirected graph. This undirected graph contains two sets of nodes V and W, and there are no edges between nodes in V (or in W). Thus, it is a bipartite graph, denoted by $G_b$, and as shown in FIG. 2. Both the directed graph G and the equivalent bipartite graph $G_b$ model IP network topologies, and they are used interchangeably herein.

The multi-access network model of FIG. 2 may be further analyzed as follows. Suppose there are |V|=n routers R, and |W|=m networks N interconnected by the routers. An important question to resolve concerns the smallest value of m (as a function of n) needed in order to represent all possible network topologies. That is, given any bipartite graph $G_b$, an auxiliary graph G*=<V,E*> may be constructed on router-nodes so that two router nodes are connected by an edge if they connect to a common network node in $G_b$. Essentially, G*=<V,E*> represents a "connectivity-pattern" among routers in $G_b$. The smallest value of m is then determined such that for each possible G* on n nodes, there is a $G_b$ with m network nodes that will correspond to this particular G*. It can be shown that m=$\lfloor n/2 \rfloor \lceil n/2 \rceil$.

A Protocol Test Procedure

Starting with an empty network topology graph, the present test procedure inserts or deletes an edge or a node on a probabilistic basis, until the graph becomes complete. After each network topology update, the operation of a router under test (RUT) is checked concerning its (1) network topology database, (2) routing table, and (3) packet forwarding behaviors. The overall testing strategy may be summarized as follows.

Testing Strategy

Ideally, the RUT should be checked for all possible network topologies. As mentioned, this is impractical since in most applications there will be too many possibilities, namely, $2^{n \lfloor n/2 \rfloor \lceil n/2 \rceil}$ possible topologies. Instead, a small portion of all possible network topologies are generated probabilistically in such a manner that high fault coverage is assured.

The test procedure starts with a graph $G_b$=<V,W,$E_b$> with only one router-node V={$v_o$}, which is the router under test, and with W=$E_b$=φ. The RUT ($v_o$) is initially connected to one or more networks, $w_o$, . . . , $w_r$, through physical links such as Ethernet or T1-lines. The initial edge set is $E_b$={[$v_o$, $w_i$], i=0, 1, . . . r}. For clarity, assume the procedure starts with an empty network topology except for the one router-node $v_0$.

Depending on the network where a router is to be deployed, an upper bound n is set on the number of router-nodes V in the network. The number of network-nodes W is bounded above by c(n)=$\lfloor n/2 \rfloor \lceil n/2 \rceil$ as previously noted. The following steps are repeated until $G_b$ becomes a complete bipartite graph with n router-nodes V, and c(n) network-nodes W.

1. Randomly insert or delete an edge. An edge insertion means that a new link is added between a router and a network, or that a previously downed link has been restored. An edge deletion means that a link between a router and a network has gone down.

2. Randomly insert or delete a router-node (or network-node). To insert a router-node (or network-node) means that a new router (network) is added, or that a crashed router (network) is restored with all previous links before the crash. To delete a router-node (network-node) means that a router (network) crashes with all its links to networks (routers) down; the downed links are removed from the graph and saved for later restoration.

3. Maintain a set $V_0 \subseteq V$ of neighboring router-nodes of $v_0$, which are connected by a network-node with $v_0$. Specifically, a router-node v is in $V_0$ if and only if there exists a network-node w such that $[v_o, w], [w, v] \in E_b$.

4. For each network topology generated above, check the router under test in node $v_0$ for:

(a) Network topology database and routing table.
  For each neighboring router-node v in $V_0$:
  i. Compute its routing update information due to a topology change;
  ii. Send the computed information to $v_0$;
  iii. Obtain a network topology database and routing table information from the router under test $v_0$;
  iv. Compute an expected network topology database and routing table for router-node $v_0$;
  V. Compare information from items (iii) and (iv).
  A discrepancy indicates a fault.

(b) Packet forwarding behavior.
  For each neighboring router-node $v_i$ in $v_0$:
  i. Find all the router-nodes v in V such that the chosen path by the routing protocol under test—usually a shortest path—from $v_i$ to v contains $v_0$, and determine the first node u in $V_0$ which is on the path after $v_0$; thus defining a correct path $[v_i, \cdot v_o, \ldots, v]$.
  ii. Construct and send an IP packet P from $v_i$ to each such router-node v;
  iii. Router-node u should receive packet P from the router under test at $v_o$; If not, there is a fault.

Test Procedure

The testing strategy described above can be set out as a test procedure generally applicable to all Internet routing protocols, including RIP, OSPF and BGP. The following constants, parameters and variables are first defined:

1. n (input parameter): upper bound on the number of router-nodes;
2. $c(n) = \lfloor n/2 \rfloor \lceil n/2 \rceil$: upper bound on the number of network-nodes;
3. $0 \leq p_1, p_2, p_3, p_4 \leq 1$ (input parameter): probability of edge insertion, node insertion, edge deletion, and node deletion, respectively; $p_1 + p_2 + p_3 + p_4 = 1$.
4. $G_b = <V, W, E_b>$; (variables): topology graph (e.g., FIG. 2) with router-nodes V, network-nodes W, undirected edges $E_b$;
5. $v_0$ in V (constant): router-under-test (RUT);
6. $v_0$ (variable): set of neighboring router-nodes of $v_0$, i.e., router-nodes that are connected with $v_0$ by a network-node. For example, in FIG. 2, routers R2, R3 and R4 are the set of neighboring router nodes of router node R1.

Figure 3:
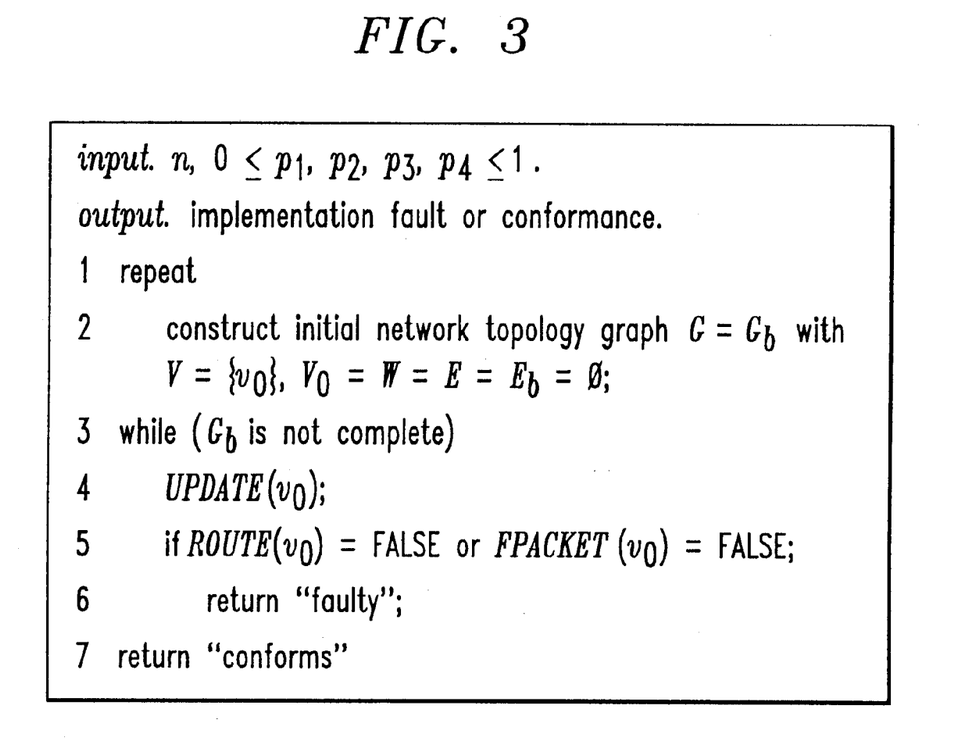
FIG. 3 is a program for executing the test procedure of the invention.
Figure 4:
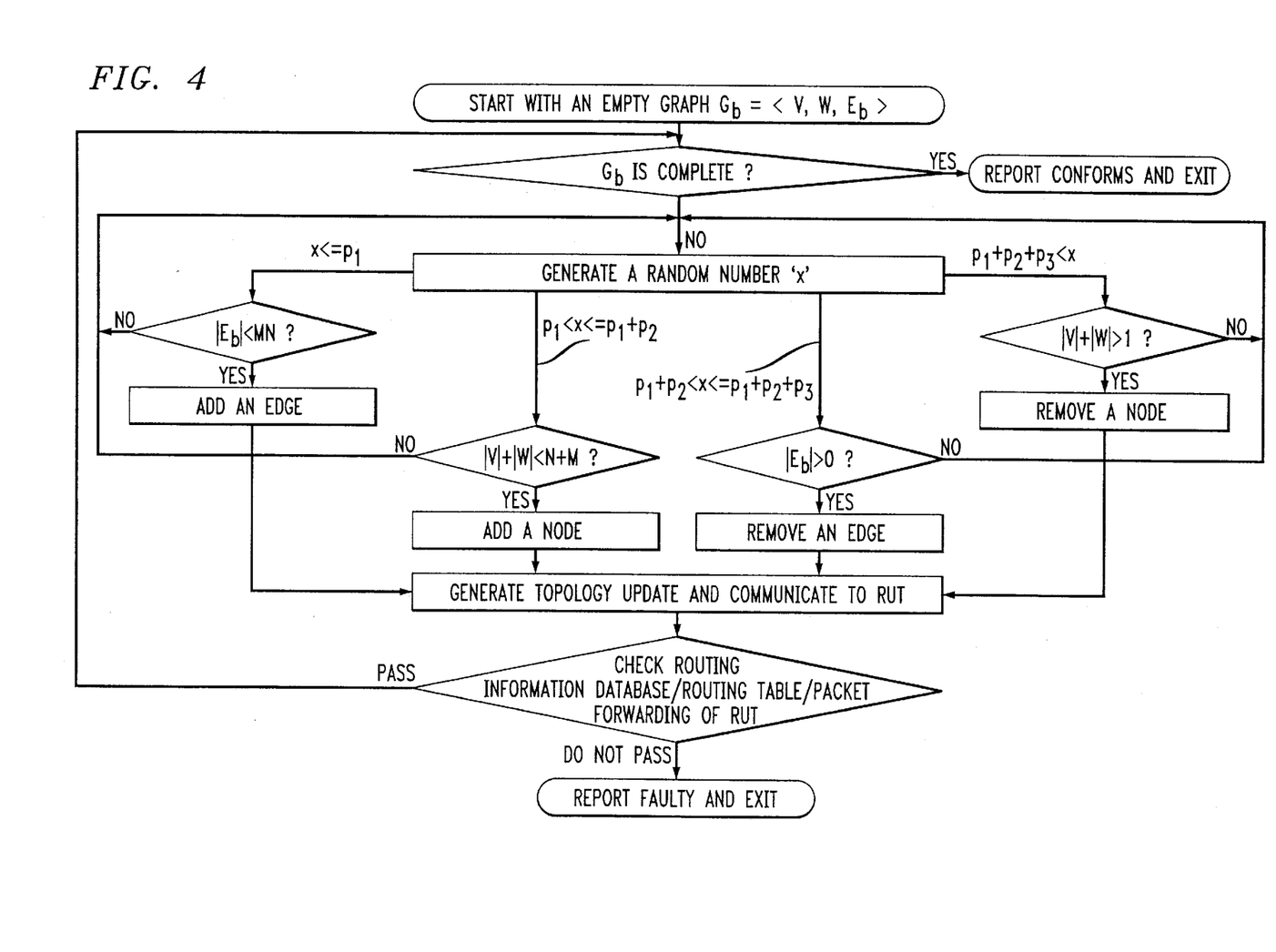
FIG. 4 is a flow chart of the program of FIG. 3.

The present Test Procedure may be carried out by the program of FIG. 3. A flow chart of the program is shown in FIG. 4.

The procedure is probabilistic-in nature. The expected number of iterations of the while-loop in line 3 of FIG. 3 is described below. Each iteration of the while-loop guarantees a small fault-coverage. Thus, repeating the test inside the while-loop increases fault-coverage.

The repeat-loop in line 1 of FIG. 3 is run for a sufficient number of times for a desired fault coverage. The required number of repetitions is computed later for specific protocol testing. Line 2 constructs an initial network topology graph with only one router-node $v_0$. The while loop in line 3 continues until a complete bipartite graph is obtained.

Subroutine UPDATE($v_0$) in line 4 obtains a new network topology, as described in items 1 to 3 of the Testing Strategy, above. This subroutine is described below with a run time analysis. Subroutines ROUTE($v_0$) and FPACKET($v_0$) in line 5 check the routing table and packet forwarding behavior of the router under test, per items 4(a) and 4(b) of the Testing Strategy. If any faults are detected, the process is aborted and a "faulty" indication is returned in line 6. Otherwise, a conformance indication is given in line 7 with confidence in the topologies and router behaviors that have been tested.

Subroutine FPACKET($v_0$) is also discussed below, followed by a description of ROUTE($v_0$) for RIP, OSPF and BGP since route ($v_o$) checks different functions for the different protocols.

Subroutine UPDATE($v_0$) and Run Time Analysis

The loop in line 3 of the program in FIG. 3, is repeated until a complete bipartite graph is obtained. Each repetition of the loop runs the subroutine UPDATE($v_0$) in line 4, which generates a test network topology for testing the router.

Figure 5:
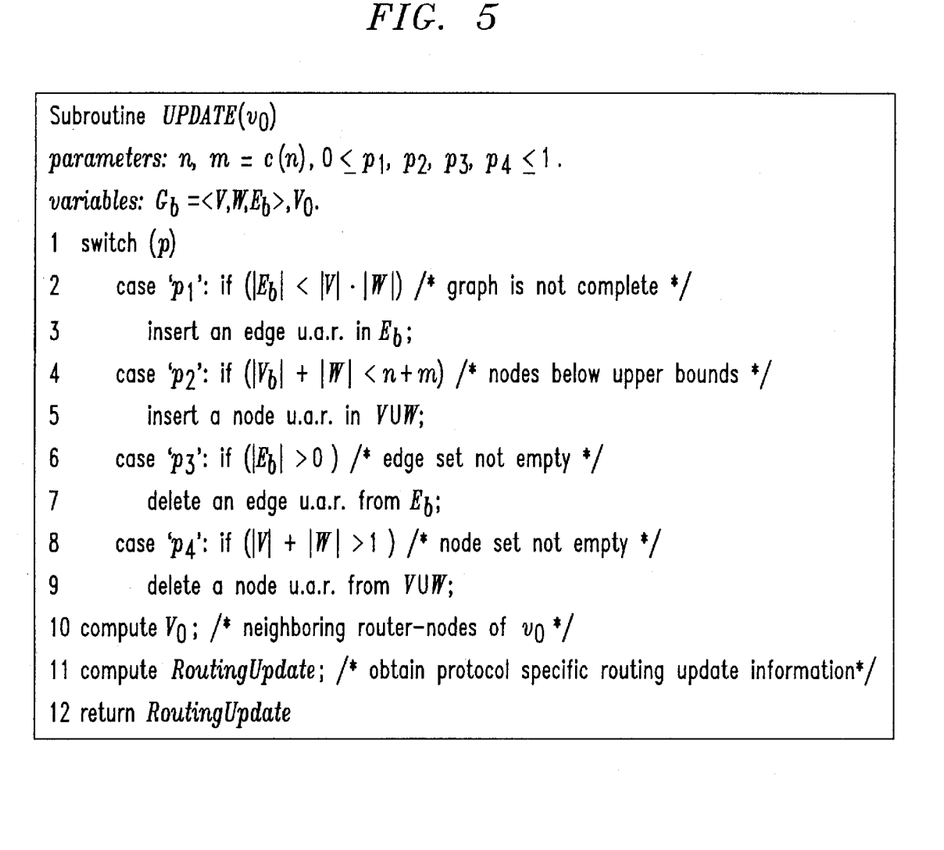
FIG. 5 is a first subroutine of the program in FIG. 3.

Subroutine UPDATE ($v_o$) is shown in FIG. 5. For a network topology update, one of the four operations on edge or node insertion, or deletion, is performed with probabilities $0 \leq p_1, p_2, p_3, p_4 \leq 1$. The unit interval can be partitioned into four subintervals $I_1=[a_0, a_1], I_2=[a_1, a_2], I_3=[a_2, a_3], I_4=[a_3, a_4]$ with $|I_1|=p_1, |I_2|=p_2, |I_3|=p_3, |I_4|=p_4$. Sampling uniformly at random (u.a.r.) in the unit interval obtains $0 \leq p \leq 1$, and the value of p is "switched" on in line 1 of FIG. 5. Depending on the sampled value of p, one of the cases is executed at line 2, 4, 6, or 8.

For an edge insertion at line 2 of FIG. 5, a current graph must not be complete. Among edges which have never been present in the graph, one is selected u.a.r. and inserted into the edge set $E_b$. Similarly, for node insertion, line 4 checks if the number of nodes has reached the upper bound. For edge deletion, line 6 checks if the edge set is empty; and for node deletion, line 8 checks if there are any nodes in the graph besides the router-node under test.

It can be shown that an expected number of iterations of the while-loop in the test procedure program, which determines its run time, is at most:

$$(n + c(n) + n \cdot c(n) - 1)^2,$$
$$\frac{n + c(n) + n \cdot c(n) - 1}{p_1 + p_2 - p_3 - p_4}, \quad \begin{array}{l} \text{if } p_1 + p_2 - p_3 - p_4 = 0 \\ \text{if } p_1 + p_2 - p_3 - p_4 > 0 \end{array}$$

where n is the maximal number of router-nodes, $c(n) = \lfloor n/2 \rfloor \lceil n/2 \rceil$, and $p_1, p_2, p_3$, and $p_4$ are the chosen probabilities of edge insertion, node insertion, edge deletion, and node deletion, respectively. Therefore, any possible network topology with not more than n router-nodes has a non-zero probability of being simulated for a RUT using the program of FIGS. 3 and 4.

The probability distributions may be chosen so long as $p_1 + p_2 \leq p_3 + p_4$. For example; $p_1 = 0.40, p_2 = 0.30, p_3 = 0.20$ and $p_4 = 0.10$. This will guarantee completion of the test program by assuring that the numbers of nodes and edges in successive test topologies will tend to increase over time, until the bi-partite graph (e.g., FIG. 2) is complete. In practice, various heuristics can be used to reduce test run time. For example, the subroutine UPDATE may be modified so that the procedure stops before the bipartite graph becomes complete.

Subroutine FPACKET ($v_0$) and Packet Forwarding Check

Figure 6:
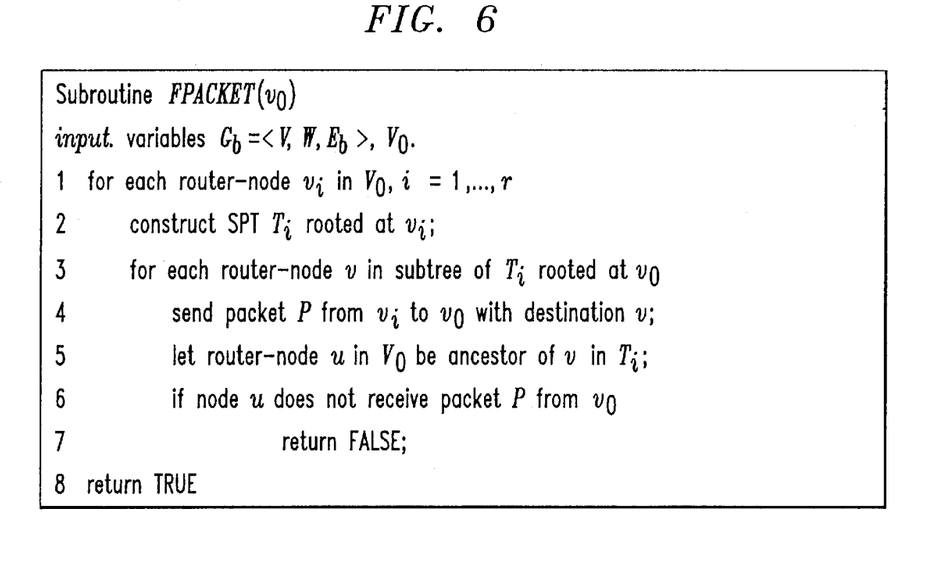
FIG. 6 is a second subroutine of the program in FIG. 3.

Subroutine FPACKET ($v_0$) at line 5 of the test procedure program and shown in FIG. 6, determines if the RUT forwards packets correctly. Each packet switched by the router-node under test $v_0$ must pass through a router-node in the neighboring set $V_0$, and only the packet forwarding behavior of $v_0$ for packets sent from $V_0$ needs to be checked. First, for each router-node $v_i$ in $V_0$, all the router-nodes $v$ in $V$ are found such that the path chosen by the routing protocol under test—usually a shortest path from $v_i$ to $v$—contains $v_0$. The router-node u in $V_0$ which is the first node on the path from $v_0$ to $v$ is then determined. Hence, a packet P sent from $v_i$ to $v$ along the path [$v_i, v_o, u, \ldots, v$] must be received by u in $V_0$. When an IP packet P is constructed and sent from $v_i$ to the destination router-node $v$, the router-node u must receive the packet P from $v_0$; otherwise, there is a fault and the subroutine returns FALSE.

Assume that the applicable routing protocol uses a shortest path route. (For BGP, a similar scheme can be devised with the notion of "preferred routes.") For each router-node $v_i$ in $V_0$, line 2 of FIG. 6 constructs a shortest path tree (SPT) rooted at $v_i$, and the router-node under test $v_0$ is a child of $v_i$. A packet from $v_i$ to a destination router-node $v$ passes $v_0$ if and only if $v$ is a descendant of $v_0$ in the SPT $T_i$. Lines 3–7 check $v_0$ for its forwarding of packet P from $v_i$ to $v$. The packet P must be sent from $v_0$ to u, a node in $V_0$ and an ancestor of $v$. Otherwise, a fault in packet forwarding is reported in lines 6–7 of the subroutine in FIG. 6.

All the executions and subroutines of the present test program have been described except for subroutine ROUTE ($v_o$). The latter tests the database information and routing tables computed by the RUT. Details of router database information vary with different routing protocols, and they are now discussed for RIP, OSPF, and BGP.

Testing RIP Routing Table

Routing Information Protocol, or RIP, is a simple distance vector protocol. See C. Hedrick, supra. It uses an asynchronous version of the known Bellman-Ford algorithm to construct shortest paths to all router-nodes connected to the network. See N. A. Lynch, Distributed Algorithms (Morgan Kaufman 1996). For RIP, c(u,v)—the cost of interfacing from router-node $v$ to network-node w—is always equal to one. In addition, any host at a distance greater than 15 hops is considered unreachable. For each destination node, the routing table contains the distance (number of hops) to the node, and also the next-hop node to which packets for the destination node are to be routed.

RIP aims to cope with networks having nodes and links going up and down on a dynamic basis. Every 30 seconds, a router-node sends its distance vector to all its neighboring router-nodes. Whenever a router-node receives a distance vector from one (or many) of its neighbors, it updates its distance vector, using the Bellman-Ford algorithm. If a router-node does not receive any packets on a given link for 180 seconds, it assumes that the link has failed. To make sure that distance vectors are updated efficiently, and also to avoid routing loops, most implementations use various heuristics. For example, under "Triggered update", if a node's distance vector is updated it immediately sends the updated distance vector to all its neighbors. Under the "Split horizon" heuristic, if nodes u and v are neighbors and u's shortest path to node w goes through node v, then node u will not convey any distance information about node w to node v.

The present test procedure program tests RIP for routing information in the subroutine ROUTE, and packet forwarding behavior is tested in subroutine FPACKET ($v_0$) with network topologies being generated dynamically by subroutine UPDATE ($v_0$). Subroutine ROUTE for RIP routing information testing, is now discussed.

Subroutine ROUTE and Routing Information Testing (for RIP)

Figure 7:
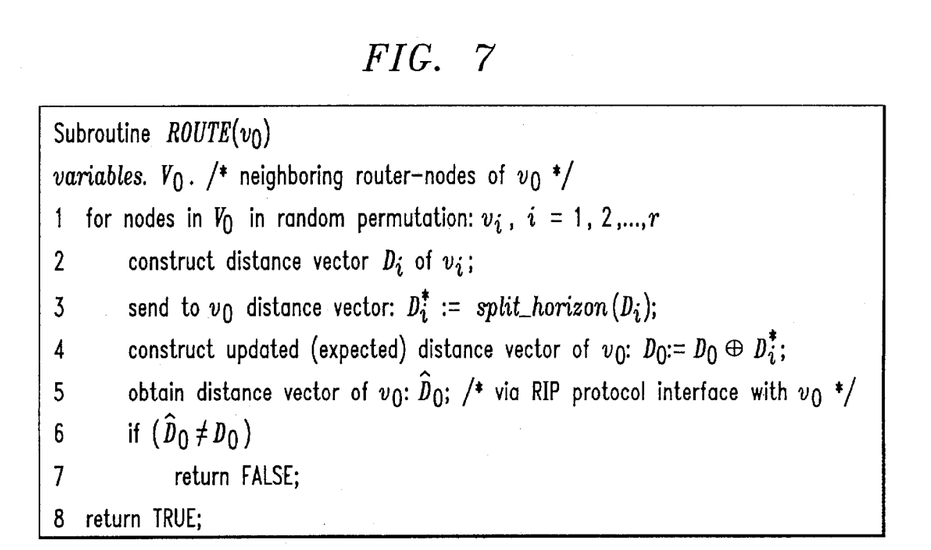
FIG. 7 is a third subroutine of the program in FIG. 3, for the Routing Information Protocol (RIP)

Subroutine ROUTE($v_0$) in FIG. 7 checks whether or not the router under test at $v_0$ responds correctly to a changed network topology, i.e., whether it constructs a correct distance vector. After a network topology update, a neighboring router-node $v_i$ in $V_0$ sends its updated distance vector to $v_0$, and checks for a corresponding response from $v_0$, specifically, whether or not (1) a correct distance vector $D_0$ is constructed at $v_0$; and (2) a correct distance vector "split_horizon" ($D_o$) is received by $v_i$ from $v_0$.

After a network update of UPDATE($v_0$) in the program of FIG. 3, the set of neighboring router-nodes $V_0$ is identified. The response of $v_0$ to each node $v_i$ in $V_0$ is checked in a random order as follows. In lines 2–3 of FIG. 7, the distance vector $D_i$ of node $v_i$ is constructed and the modified version of $D_i$ according to the split horizon heuristic $D_i^*$=split_horizon ($D_i$) is sent to $v_o$, simulating the behavior of a router implementation. Line 4 constructs the updated distance vector $D_0$ of $v_0$ (by the process specified in the RIP protocol) after receiving $D_i^*$ from $v_i$ for a check as follows. Router-node $v_i$ obtains $D_o$, the distance vector of $v_0$, via RIP interface with $v_0$ in line 5. The vector should correspond to the computed routing table $D_0$. This is checked in line 6 of FIG. 7, and a fault is declared in line 7 if there is a discrepancy.

Analyzing Fault Coverage

It can be shown that if the implementation contains a single-fault involving vertices $v_1$, $v_2$ and $V_3$, then subroutine ROUTE($v_0$) in FIG. 7 will detect a fault on any graph G satisfying the following criteria:
1. Edges ($v_0,v_1$), ($v_1,v_2$), ($v_2,v_3$), ($v_3,v_1$) exist.
2. Neither ($v_0,v_2$) nor ($v_0,v_3$) exists.
3. No vertex except $v_1$, is adjacent to both $v_0$ and $v_2$.
4. No vertex except $V_3$ is adjacent to both $v_1$ and $v_2$.

It can also be shown that any given iteration of the while-loop (on line 3) in the test procedure program of FIG. 3 will catch any single fault with probability of at least $1/e^2n^2$. Further, for any $\epsilon>0$, repeating the while loop at line 1 of the program $e^2n^2\ln(1/\epsilon)$ times will catch a single fault with probability $\epsilon$.

Testing OSPF Protocol

While RIP suits networks with diameters less than 16, OSPF or Open Shortest Path First is intended for larger networks with thousands of nodes. Routing table constructions and testing procedures for routers under OSPF will therefore differ from those for RIP.

OSPF Protocol

OSPF is a link state routing protocol. Neighboring OSPF routers maintain their adjacency relationship by exchanging "Hello" packets. Each OSPF router generates link state advertisements (LSAs) to describe its own network connections and routes learned from other routing protocols. For a broadcast network, a designated router is responsible for maintaining adjacency relationships for all routers on the network. These LSAs are sent to adjacent OSPF routers via flooding.

Each OSPF router keeps a LSA database that describes current network topology, and exchanges its database information with all its neighbors so that each node has the same view of the network topology. Based on the network topology information in the LSA database, each router-node constructs a routing table using shortest path algorithms. See A. V. Aho, et al, The Design and Analysis of Computer Algorithms (Addison-Wesley 1974), all relevant portions of which are incorporated by reference.

The present test procedure tests routers under OSPF for routing information by the subroutine ROUTE($v_0$), and for packet forwarding behavior by the subroutine FPACKET ($v_0$). Network topologies are generated dynamically by the subroutine UPDATE ($v_0$). Subroutine ROUTE($v_0$) is now described for the OSPF protocol, with reference to FIG. 8. Subroutine ROUTE and Link-State Database Testing (for OSPF)

Routing tables of routers under the OSPF protocol are tested in a similar way as for RIP. It has been found, however, that a link-state database is most error prone in OSPF implementations due to incessant changes in network topologies. Thus, the LSA database of the router under test is also checked.

Figure 8:
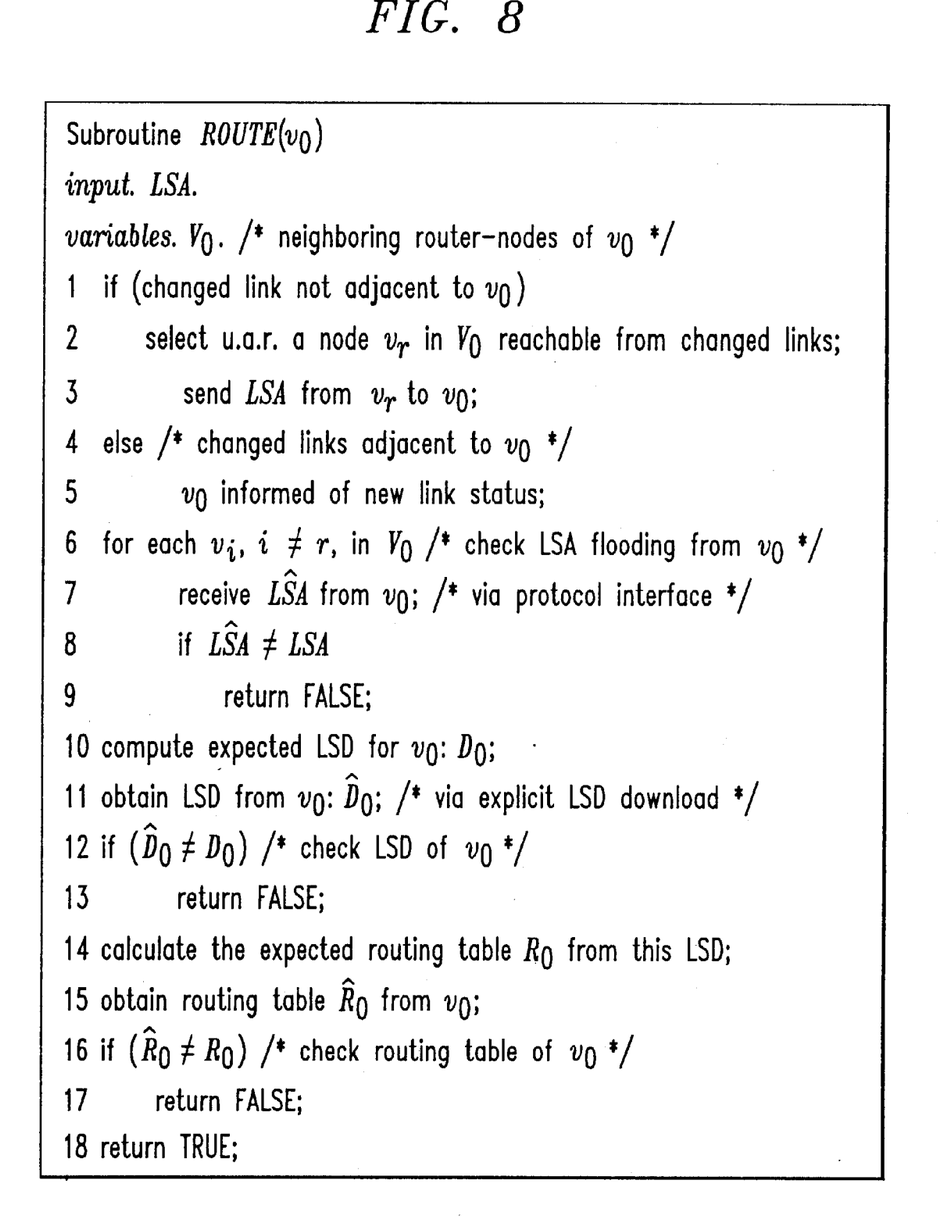
FIG. 8 is the third subroutine of the program for the OSPF protocol.

Subroutine ROUTE($v_o$) for OSPF in FIG. 8 checks whether or not a router under test responds correctly to a changed network topology with a link (edge) or node up or down. Specifically, ROUTE($v_o$) checks if: (1) after receiving a link-state advertisement LSA, the router under test $v_0$ constructs a correct link-state database $D_0$; (2) $v_0$ floods a correct link-state advertisement to each immediate neighbor node $v_i$ in $v_0$; and (3) $v_0$ constructs a correct routing table from its LSA database.

Whenever a link is down, the two adjacent nodes detect the condition and form a LSA to send to all neighbors. Whenever a router node or a network node is down, all its neighbors assume that all links to that node are down, and flood this information through an LSA. For each node or link up or down, this network update information is denoted by a LSA. Line 4 of the test procedure program in FIG. 3 is modified and this information is collected via LSA=UPDATE($v_0$).

Testing BGP

Routers within the Internet are grouped into administrative units called autonomous systems (AS). RIP and OSPF are examples of routing protocols used within an AS. Border Gateway Protocol or BGP is the routing protocol of choice between autonomous systems. See Y. Rekhter, et al, supra, all relevant portions of which are incorporated by reference. Each router maintains its preferred paths (called AS-Path: a list of all nodes in each path), to all possible destinations. Each BGP router advertises these paths to all its adjacent (peer) routers.

A key aspect of BGP is that a path used for routing is not necessarily the shortest path. This is done by specifying a set of policies. Each AS can independently set preferences for its neighboring routers. When an AS receives two different routes for the same destination, it generally picks the route advertised by the router with the higher preference.

A simple BGP router test procedure can use a subroutine for checking routing information, similar to ROUTE($v_0$) for RIP protocol testing shown in FIG. 7. An important difference is that rather than exchange distance vectors, AS-PATHs to each possible destination node are exchanged instead. A routing policy for the router under test is set, and the RUT is checked as to whether or not it correctly computes a set of preferred paths to all destinations.

Note that this strategy tests only the behavior of the RUT for the policy that was chosen, and that a fault may show up only under certain routing policies. Changing routing policies for a router while testing is in progress is feasible using outside software tools available for routers manufactured by certain vendors.

Example of a Software Tool

Figure 9:
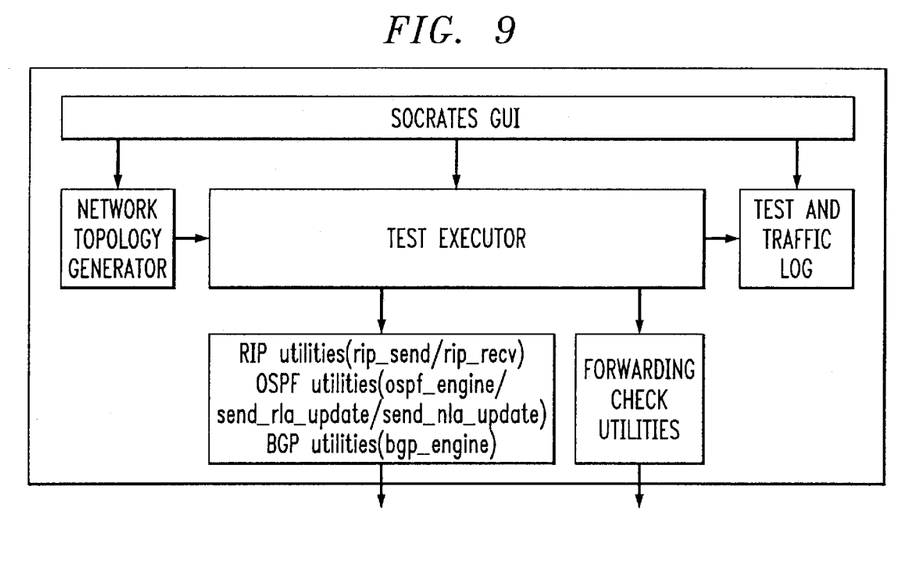
FIGS. 9 and 10 represent a software tool for testing routers according to the present procedure.
Figure 10:
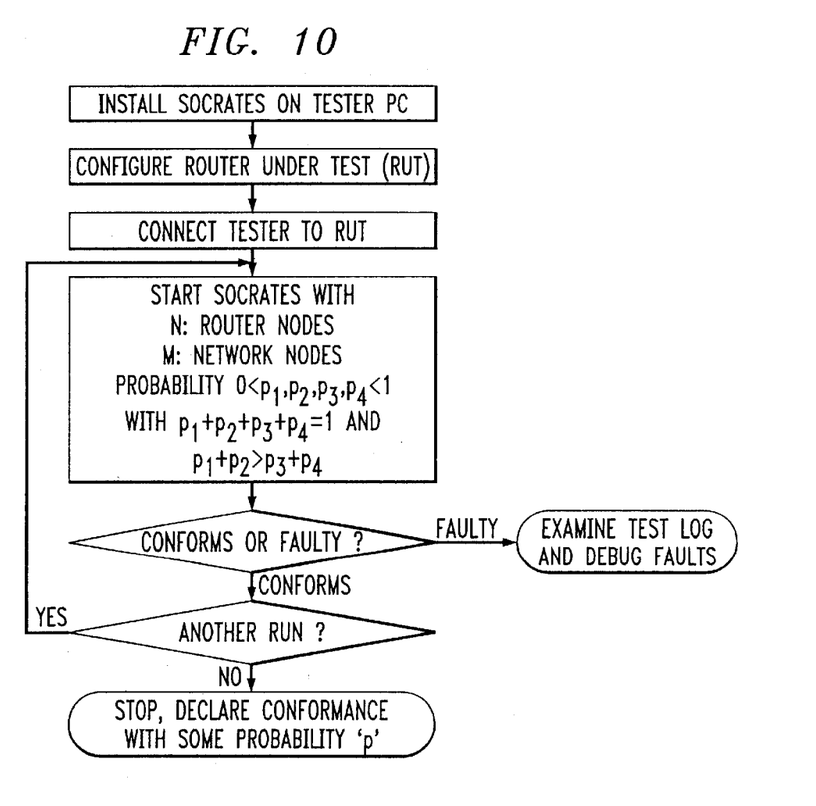
Figure 11:
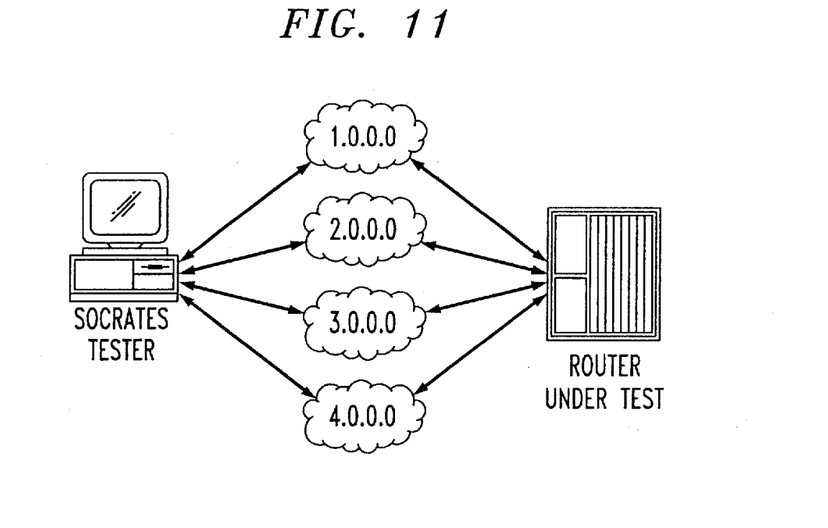
FIG. 11 shows a physical testing configuration for a router under test using the present procedure.

A portable software tool (referred to herein as "Socrates") was developed for testing routers under different Internet routing protocols, and is represented in FIGS. 9 and 10. The software was run on a workstation capable of connecting to the router under test (RUT) via at least two Ethernet networks as shown in FIG. 11. Using the test procedure program and subroutines described herein, Socrates simulates network topologies for the RUT in software. Each RUT exchanges messages with Socrates as though it were part of a network of routers. The tool was written in ANSI C and run under the Linux operating system, and testing of routers using RIP, OSPF and BGP Internet routing protocols was undertaken.

As shown in FIG. 9, Socrates includes four components and several auxiliary utilities. The four components are (A) Network Topology Generator, (B) Test Executor, (C) Test and Traffic Log, and (D) Socrates GUI.

Network Topology Generator models the network topology as a graph, simulates network links (or routers) up or down by adding or removing edges (or nodes) of the graph. For each topology change, a "test case" is generated and sent to Test Executor.

Test Executor implements the corresponding ROUTE($v_0$) subroutine for RIP, OSPF or BGP, and the corresponding FPACKET ($v_0$) subroutine. It executes the test cases and verifies that the RUT correctly updates its routing table and forwards IP packets. Test Executor uses utilities discussed below to send topology updates to the RUT, to query the RUT to obtain an updated routing table and to compare the updated table with a calculated expected routing table, to perform a packet forwarding check if there is a change in the routing table, and to make a final test judgment.

Test and Traffic Log records all generated test cases in a log file. This log file can be used as an input later in order to re-run the test procedure with the same test cases. This helps to replicate failure situations. For debugging purposes, the IP level trace of all message exchanges between the RUT and Socrates can also be logged. The Socrates GUI allows a test operator to see various stages of the test execution.

Socrates uses some auxiliary utilities to communicate with the RUT and to carry out real testing. These are RIP utilities, OSPF utilities, BGP utilities, and packet forwarding checking utilities. Except for BGP utilities, which is based on a TCP connection for packet exchange, all other utilities use networking facilities of the host operating system to read all packets on the network in a promiscuous mode, and to generate packets from arbitrary source addresses. This allows emulation of multiple routers, with different IP addresses, from a single testing host.

RIP utilities includes, for example, "rip_send" and "rip_recv". Whenever there is a change in the network topology graph during RIP testing, rip_send may be used to send a RIP update packet (reflecting the change) to the RUT; and rip_recv may be used explicitly to query the RUT to obtain the updated routing table.

OSPF utilities include, for example, "ospf_engine", "send_rla_update", and "send_nla_update". An ospf_engine is a small OSPF kernel, but may be controlled by the Test Executor through the Socrates control protocol. An ospf_engine's function is to maintain a fully adjacent relationship between the RUT and itself. It also synchronizes its local LSA database with the RUT and responds to all flooding, to ensure it has an exact image of the LSA database in the RUT.

When there is a change in the network topology graph during OSPF testing, a new router-LSA is generated to reflect the change. A new network-LSA may be generated depending on which node is the designated router for the affected network in the graph. These two LSAs are sent to the RUT using, for example, "send_rla_update", and "send nla_update", respectively.

A "bgp_engine" program sets up a TCP connection between the RUT's BGP port and the test host. It is controlled by Test Executor via the Socrates control protocol, to exchange BGP packets with the RUT. Whenever there is a change in the network topology during BGP testing, bgp_engine is directed to send a BGP UPDATE packet to the RUT.

Packet forwarding checking utilities verify the RUT's forwarding behavior whenever there is a change in the RUT's routing table. To keep low-level code simple, the utilities only report if packets to a single destination node are being forwarded. A set of destination nodes to check is selected within the test environment.

Network Topology Simulation

Figure 12:
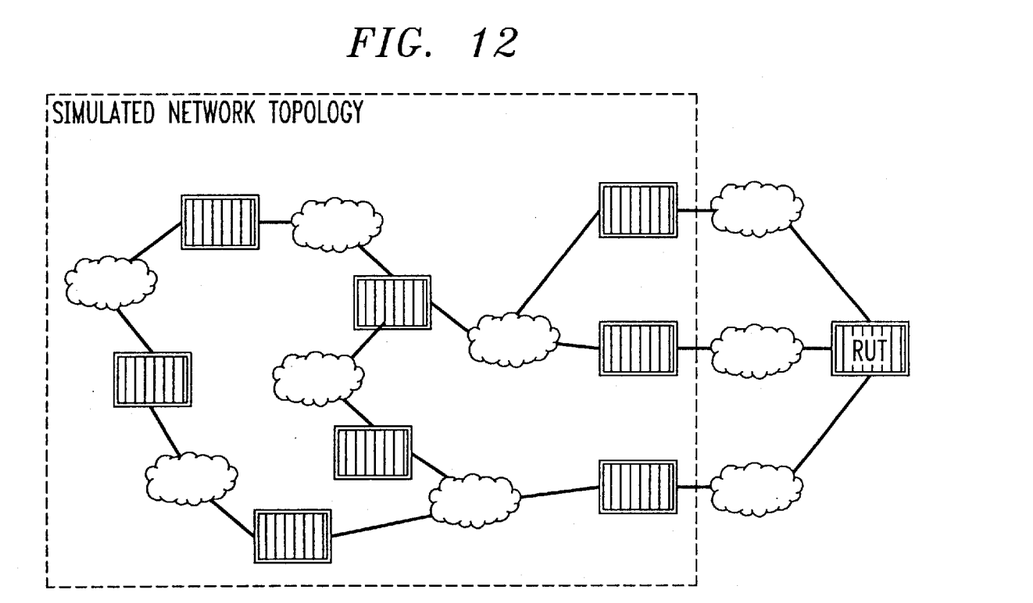
FIG. 12 shows the router under test with a test network topology simulation.

FIG. 12 shows a RUT with a network topology simulation. Network Topology Generator generates random network topologies by simulating topology changes. Each network topology is then simulated by Test Executor, and, from the point of view of the RUT, the RUT is interacting with a real network. Although Network Topology Generator may use the same probabilistic routine for topology/graph generation, edges and nodes in the graph may have different meanings for router testing under the RIP, OSPF and BGP protocols when Test Executor simulates a generated network topology.

For RIP and OSPF testing, a node in the graph can represent either a router or a network. An edge between a network node and a router node means the router has an interface connected to the network. A network node can have more than one router node connected to it. In the latter case, the network is a transit network. Otherwise, it is a stub network. A router node may also connect to more than one network. The adding/removing of edges in the graph simulates up/down conditions of the router's interface. The removing/adding of router nodes simulates crash/recovery conditions of routers. The adding/removing of network nodes simulates up/down conditions of physical network links.

Because OSPF routers exchange "Hello" packets to maintain their adjacency relationship, the ospf_engine utility is run for each simulated router node which has direct connections with the RUT. The up and down states of these direct connections, as well as the active or inactive state of the ospf_engine utility, may be controlled by Test Executor through the Socrates control protocol.

For BGP testing, each node in the graph represents a BGP router in the simulated network topology. An edge between any two nodes means a BGP peering relationship exists between the two associated BGP routers. Each BGP router has an associated unique AS number, and advertises a set of fixed routes to its neighboring routers. Because BGP is a connection oriented protocol, the bgp_engine utility is run for each simulated BGP router that is peering with the RUT. The utility engine exchanges BGP KEEPALIVE messages with the RUT to maintain the peering relationship. It also sends and receives BGP UPDATE messages under the control of Test Executor.

Experiments

Socrates was used to test RIP and OSPF protocol implementations of a "Gated", Lucent "PacketStar", and Cisco 7206 router. Test sessions were conducted with four Ethernet interfaces connected to the RUT, as shown in FIG. 11.

To verify that Socrates could detect implementation errors, a bug was introduced into the RIP source code for the Gated router by modifying the way the code processed an RIP update. Specifically, the "buggy" implementation ignored the last entry of any distance vector it received. The Socrates routine was used to test against this buggy implementation, and it was found that for a configuration of size 20 routers×100 networks, Socrates caught the bug in less than one minute.

Testing of OSPF implementations resulted in successful test sessions with no interoperability issues. One minor problem occurred when one vendor's router sent redundant OSPF DD packets during LSA database synchronization. It was also found that compared with Gated, commercial routers will perform a stricter correctness check before accepting OSPF LSAs into their LSA database.

While the foregoing description represents preferred embodiments of the invention, it will be obvious to those skilled in the art that various changes and modifications may be made, without departing from the spirit and scope of the invention pointed out by the following claims.

We claim:

1. A method of testing a network router for operation according to a given protocol, comprising:

coupling a router under test (RUT) to a test host device;

configuring the device to simulate a network having at most a given number of router nodes and at most a given number of network nodes, with edges connecting the router and the network nodes to one another;

exchanging information packets between the host device and the RUT for each of a number of successive test network topologies;

determining each successive test network topology by inserting or deleting an edge or a node to or from a prior test network topology in a probabilistic manner;

evaluating, according to the exchanged information packets, the operation of the RUT under the given protocol with respect to at least one of routing table compilation, packet forwarding, and accumulated network topology information; and providing a judgment concerning the operation of the RUT under the given protocol.

2. The method of claim 1, including carrying out said determining step until the given number of router nodes and the given number of network nodes are attained.

3. The method of claim 1, including repeating said exchanging, said determining and said evaluating steps, thus obtaining a greater number of different test network topologies in which the RUT is evaluated.

4. The method of claim 1, including carrying out said exchanging, said determining and said evaluating steps according to Routing Information Protocol.

5. The method of claim 1, including carrying out said exchanging, said determining and said evaluating steps according to Open Shortest Path First protocol.

6. The method of claim 1, including carrying out said exchanging, said determining and said evaluating steps according to Border Gateway Protocol.

7. The method of claim 1, including carrying out said determining step by setting a first probability ($p_1$) for an edge insertion operation, a second probability ($p_2$) for a node insertion operation, a third probability ($p_3$) for an edge deletion operation, and a fourth probability ($p_4$) for a node deletion operation, wherein $p_1+p_2+p_3+p_4=1$.

8. The method of claim 7, including setting $p_1+p_2>p_3+p_4$.

9. The method of claim 1, including defining each test of network topology in the determining step as a bipartite graph $G_b=<V,W,E_b>$ wherein V=set of router nodes, W=set of network nodes, and $E_b$=set of edges between V and W.

10. The method of claim 9, including setting an initial test network topology in the determining step as an empty graph $G_b=\{v_0, \phi, \phi\}$ wherein node $v_0$ corresponds to the router under test.

11. The method of claim 7, including carrying out the determining step for each successive test network topology by generating a number x uniformly at random wherein $0 \leq x \leq 1$, and selecting one of said four operations including an edge insertion if $x \leq p_1$, a node insertion if $p_1<x \leq p_1+p_2$, an edge deletion if $p_1+p_2<x \leq p_1+p_2+p_3$, and a node deletion if $p_1+p_2+p_3<x$.

12. The method of claim 11, including returning to said generating step if the selected one of the four operations does not replicate an operative test network topology having at most the given numbers of router nodes and network nodes.

* * * * *